United States Patent
Kubota et al.

(10) Patent No.: US 10,502,953 B2
(45) Date of Patent: *Dec. 10, 2019

(54) DISPLAY DEVICE, AND MOBILE BODY HAVING SAME

(71) Applicant: Panasonic Intellectual Property Management Co., Ltd., Osaka (JP)

(72) Inventors: Kosuke Kubota, Osaka (JP); Toshiya Mori, Osaka (JP); Ken'ichi Kasazumi, Osaka (JP); Masahito Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,067

(22) Filed: Mar. 2, 2018

(65) Prior Publication Data

US 2018/0284435 A1 Oct. 4, 2018

(30) Foreign Application Priority Data

Mar. 31, 2017 (JP) .................................. 2017-072708

(51) Int. Cl.
  *H04N 9/00* (2006.01)
  *G02B 27/01* (2006.01)
  *H04N 9/31* (2006.01)

(52) U.S. Cl.
  CPC ....... *G02B 27/0101* (2013.01); *H04N 9/3147* (2013.01)

(58) Field of Classification Search
  CPC .......... G02B 17/023; G02B 2027/0127; G02B 27/0101; H04N 9/3147; H04N 9/317; H04N 9/3102; H04N 9/3129
  See application file for complete search history.

(56) References Cited

U.S. PATENT DOCUMENTS

| | | | |
|---|---|---|---|
| 2008/0049149 A1* | 2/2008 | Watanabe | G02B 27/01 348/739 |
| 2011/0051029 A1* | 3/2011 | Okumura | G03B 21/28 349/57 |
| 2014/0184996 A1* | 7/2014 | Matsushita | G02B 27/0101 349/117 |

(Continued)

FOREIGN PATENT DOCUMENTS

JP 2015-034919 2/2015

*Primary Examiner* — Zhihan Zhou
(74) *Attorney, Agent, or Firm* — Greenblum & Bernstein, P.L.C.

(57) ABSTRACT

A display device includes: a video display that displays a video for projecting a virtual image onto a target space on a video display surface; an optical element; and a projector. The optical element moves a partial video, which is a part of the video displayed on the video display surface, to a position distant from the video display in a projection direction in which the video is projected. The projector projects a virtual image viewed by a user by projecting light output from the video display and the optical element to a reflecting member. The optical element has an incident surface on which the partial video is incident, and an emitting surface from which the partial video incident on the incident surface emits. The incident surface and the emitting surface are parallel to each other.

11 Claims, 8 Drawing Sheets

(56) References Cited

U.S. PATENT DOCUMENTS

| | | | |
|---|---|---|---|
| 2015/0085088 A1* | 3/2015 | Asai | H04N 13/356 |
| | | | 348/54 |
| 2015/0234458 A1* | 8/2015 | Hsieh | G02B 27/0172 |
| | | | 345/156 |
| 2015/0286053 A1* | 10/2015 | Hu | G02B 27/0101 |
| | | | 349/11 |
| 2016/0048017 A1* | 2/2016 | Kasahara | G02B 27/0101 |
| | | | 359/633 |
| 2016/0178902 A1* | 6/2016 | Ando | B60K 35/00 |
| | | | 348/115 |
| 2017/0235138 A1* | 8/2017 | Morohashi | B60K 35/00 |
| | | | 359/631 |
| 2017/0276936 A1* | 9/2017 | Shihaku | G02B 27/0101 |

* cited by examiner

DISPLAY DEVICE, AND MOBILE BODY HAVING SAME

The present application claims the benefit of foreign priority of Japanese patent application 2017-072708 filed on Mar. 31, 2017, the contents all of which are incorporated herein by reference.

BACKGROUND

1. Technical Field

The present disclosure relates to a display device, and to a mobile body having the same. In particular, the present disclosure relates to a display device that projects a virtual image onto a target space, and to a mobile body having the same.

2. Description of the Related Art

Conventionally, a head-up display that displays various pieces of information as virtual images has been known as an information display device for a vehicle (for example, see Unexamined Japanese Patent Publication No. 2015-34919). The information display device described in Unexamined Japanese Patent Publication No. 2015-34919 forms virtual images at a plurality of positions in front of a subject vehicle along a line of sight of a driver, and allows the driver to view the formed virtual images.

Therefore, the information display device includes two screens as an image forming unit that forms light, which is projected from a video projector, into images. Two screens are disposed on routes of the light from the video projector, and the images individually formed by the two screens are reflected and magnified by an optical unit, and are projected onto such a projection target member as a windshield. Here, in order to form the virtual images at different distances from the driver, a distance from one of the two screens to the projection target member is set longer than a distance from the other of the two screens to the projection target member.

SUMMARY

The present disclosure provides a display device capable of improving resolution of a virtual image, and provides a mobile body having the display device.

A display device of a first aspect includes a video display, at least one optical element, and a projector. The video display displays a video on a video display surface. The at least one optical element moves a partial video, which is a part of the video displayed on the video display surface, to a position distant from the video display in a projection direction in which the video is projected. The projector projects a virtual image viewed by a user by projecting light output from the video display and the at least one optical element to a reflecting member. The at least one optical element has an incident surface on which the partial video is incident, and an emitting surface from which the partial video incident on the incident surface emits. The incident surface and the emitting surface are parallel to each other.

In a display device of a second aspect, in the first aspect, the at least one optical element is disposed on a part of the video display surface.

In a display device of a third aspect, in any one of the first and second aspects, the at least one optical element includes a plurality of optical elements, and the plurality of optical elements are disposed on the video display surface.

In a display device of a fourth aspect, in any one of the first to third aspects, the video display is a projection device that forms the video on the video display surface by projecting light onto the video display surface.

In a display device of a fifth aspect, in any one of the first to third aspects, the video display is a video display device that has a flat display panel displaying the video, and a backlight.

In a display device of a sixth aspect, in any one of the first to fifth aspects, the at least one optical element is disposed in front of the video display surface in the projection direction.

In a display device of a seventh aspect, in any one of the first to sixth aspects, a light diffuser that diffuses light is provided on the emitting surface of the at least one optical element.

In a display device of an eighth aspect, in any one of the first to seventh aspects, the video display surface includes a display surface of a fixed screen fixed to a predetermined position, and a display surface of a movable screen, and the at least one optical element is provided on the display screen of the fixed screen.

A mobile body of a ninth aspect includes: a body; the display device according to any one of the first to eighth aspects, the display device being mounted on the body; the reflecting member fixed to the body; and a mobile body drive unit that moves the body.

In accordance with the present disclosure, the resolution of the virtual image can be improved.

DETAILED DESCRIPTION

Prior to describing an exemplary embodiment of the present disclosure, problems found in conventional techniques will be briefly described herein. The information display device described in Unexamined Japanese Patent Publication No. 2015-34919 forms projection light from the single video projector into images on the two screens placed at different distances from the video projector. Accordingly, it has been necessary to increase (deepen) a depth of focus of an optical system provided in the video projector. As a result, there has been a problem that the resolution of the virtual images decreases.

An exemplary embodiment to be described below is merely one of various exemplary embodiments of the present disclosure. The exemplary embodiments of the present disclosure are not limited to the following exemplary embodiment, and can include embodiments other than this exemplary embodiment. Moreover, the following exemplary embodiment is variously modifiable in response to design and the like without departing from the technical idea according to the present disclosure.

(1) Outline

Figure 1:
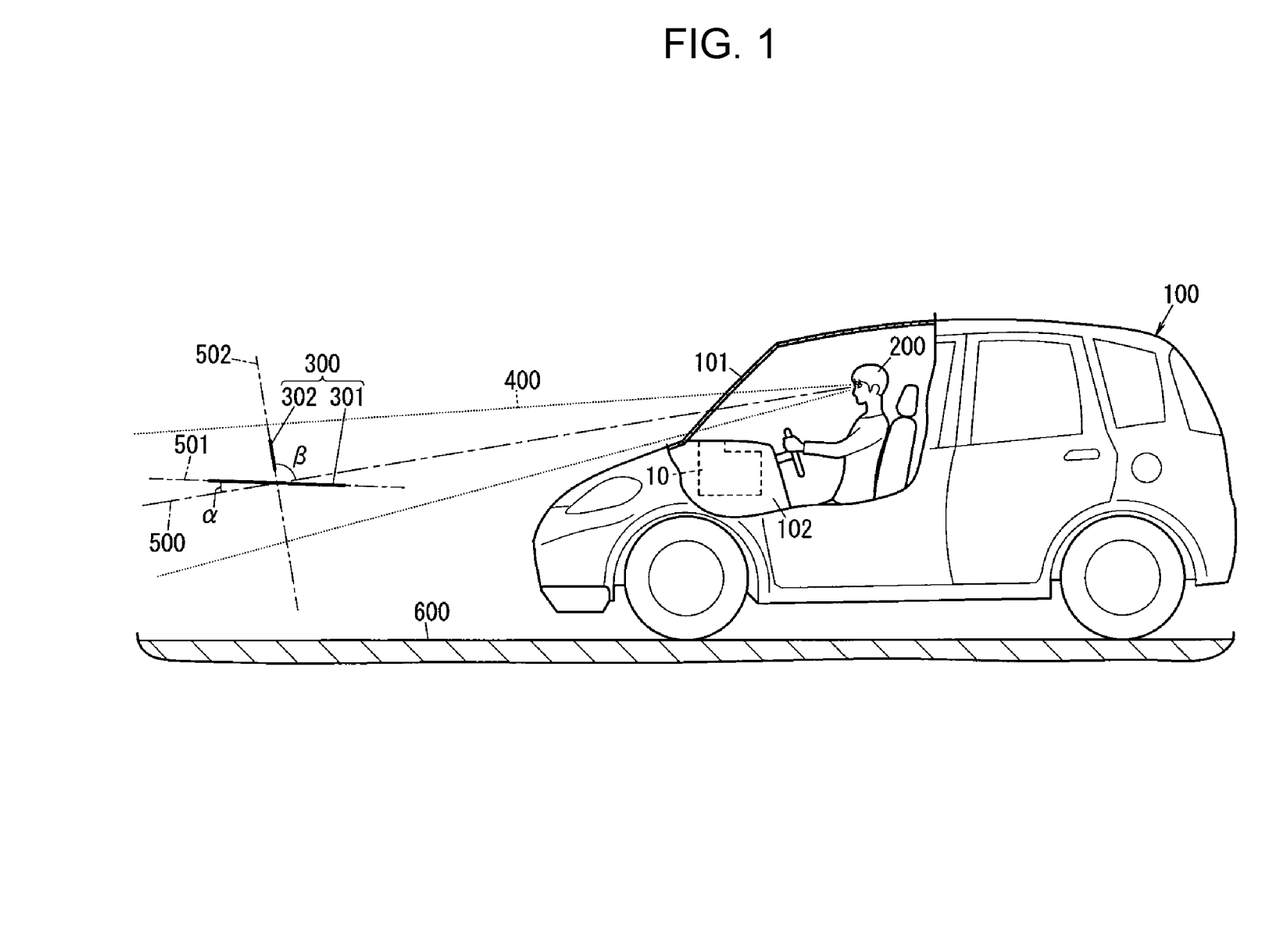
FIG. 1 is a conceptual diagram of a vehicle having a display device according to an exemplary embodiment of the present disclosure.
Figure 12:
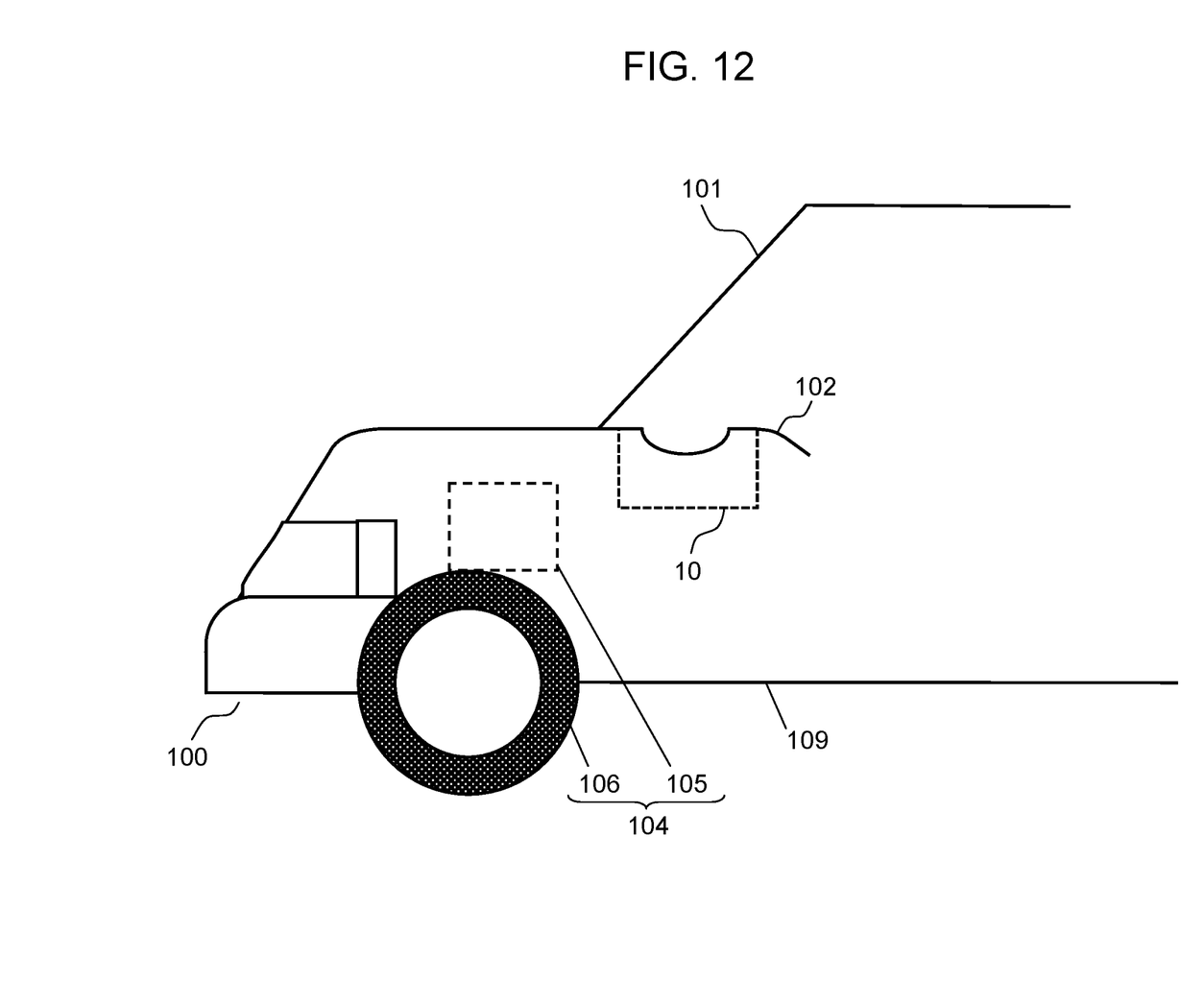
FIG. 12 is a conceptual diagram of the vehicle having the display device according to the exemplary embodiment.

As shown in FIG. 1, display device 10 according to this exemplary embodiment is a head-up display (HUD) for use in vehicle 100 as a mobile body, for example. As shown in FIG. 12, vehicle 100 includes: body 109; vehicle drive unit 104 that moves body 109; windshield 101 fixed to body 109; and display device 10 disposed in dashboard 102 of body 109. Vehicle drive unit 104 includes drive source 105 such as an engine and a motor, and drive wheels 106 driven by drive source 105.

As shown in FIG. 1, display device 10 is installed in a cabin of vehicle 100 so as to project an image onto windshield 101 of vehicle 100 from below. In an example of FIG. 1, display device 10 is disposed in dashboard 102 installed below windshield 101. When the image is projected from display device 10 onto windshield 101, the image reflected on windshield 101 as a reflection member is viewed by user 200 (driver).

In accordance with display device 10, virtual image 300 looks like being projected onto target space 400 in front of vehicle 100 (outside of the vehicle) for user 200 seated on a driver's seat. The "virtual image" mentioned herein means an image formed by a reflected ray of emitted light from display device 10 as if an object were actually present when the emitted light is reflected by a reflecting object such as windshield 101. Therefore, user 200 who drives vehicle 100 can see virtual image 300, which is projected by display device 10, while superimposing virtual image 300 on a real space spreading in front of vehicle 100. Hence, in accordance with display device 10, various pieces of driving assistance information such as vehicle speed information, navigation information, pedestrian information, front vehicle information, lane departure information and vehicle condition information can be displayed as virtual image 300, and can cause user 200 to view the various pieces of driving assistance information. In this way, user 200 can visually acquire the driving assistance information by only a slight movement of a line of sight from a state of directing the line of sight forward of windshield 101.

In display device 10 according to this exemplary embodiment, virtual image 300 formed in target space 400 includes at least two types of virtual images, which are first virtual image 301 and second virtual image 302. The "first virtual image" mentioned herein is virtual image 300 (301) formed on first virtual plane 501. The "first virtual plane" is a virtual plane in which inclination angle α with respect to optical axis 500 of display device 10 is smaller than predetermined value γ (α<γ). Moreover, the "second virtual image" mentioned herein is virtual image 300 (302) formed on second virtual plane 502. The "second virtual plane" is a virtual plane in which inclination angle β with respect to optical axis 500 of display device 10 is larger than predetermined value γ (β>γ). The "optical axis" mentioned herein is an optical axis along a direction in which the virtual image is projected onto target space 400 by projection optical system 40 (see FIG. 3) to be described later. That is, the "optical axis" means an axis that passes through target space 400 and goes along an optical path of virtual image 300. An example of predetermined value γ is 45 degrees, and an example of inclination angle β is 90 degrees.

In this exemplary embodiment, optical axis 500 is along road surface 600 in front of vehicle 100 in target space 400 in front of vehicle 100. Then, first virtual image 301 is formed on first virtual plane 501 substantially parallel to road surface 600, and second virtual image 302 is formed on second virtual plane 502 substantially perpendicular to road surface 600. For example, when road surface 600 is a horizontal plane, first virtual image 301 is formed along the horizontal plane, and second virtual image 302 is displayed along a vertical plane of second virtual image 302.

Figure 2:
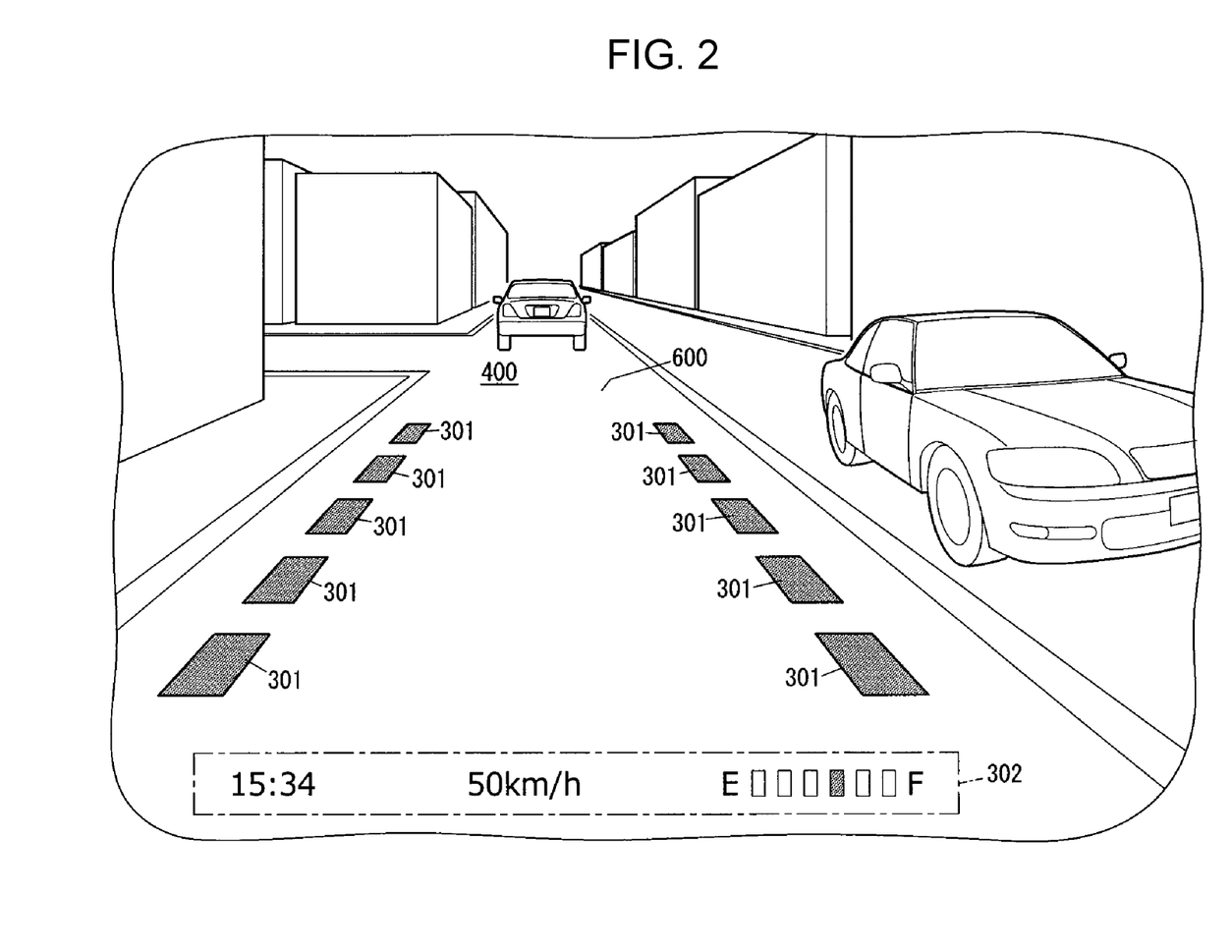
FIG. 2 is a conceptual diagram showing a user's visual field when the display device is used.

FIG. 2 is a conceptual diagram showing a visual field of user 200. That is, as shown in FIG. 2, display device 10 according to this exemplary embodiment is capable of displaying first virtual image 301 viewed with depth along road surface 600 and second virtual image 302 viewed upright on road surface 600 at a fixed distance from user 200. Hence, for user 200, first virtual image 301 looks like being present on a plane substantially parallel to road surface 600, and second virtual image 302 looks like being present on a plane substantially perpendicular to road surface 600. An example of first virtual image 301 is navigation information indicating a traveling direction of vehicle 100, where it is possible to present an arrow, which indicates a right turn or a left turn, on road surface 600. An example of second virtual image 302 is a current time, vehicle speed information, and vehicle condition information. It is possible to present these pieces of the information, for example, by letters, numbers, and symbols, or a meter such as a fuel gauge. Here, preferably, for user 200, first virtual image 301 looks like being displayed, for example, 10 m to 200 m ahead of vehicle 100 so as to serve as a guide for driving vehicle 100. Second virtual image 302 is displayed on a lower portion of windshield 101 so as not to hinder user 200 (driver) from viewing a road condition. Preferably, for user 200, second virtual image 302 looks like being displayed a few meters (for example, 2 m to 3 m) ahead of vehicle 100.

(2) Configuration

Figure 3:
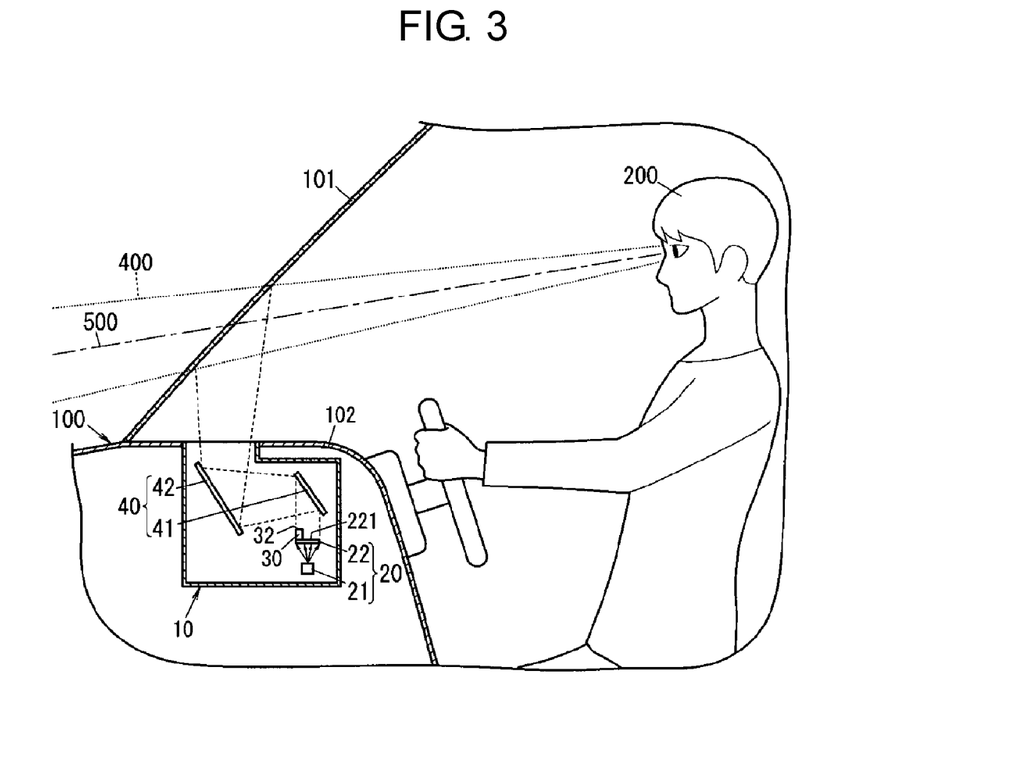
FIG. 3 is a conceptual diagram showing a configuration of the display device.
Figure 4:
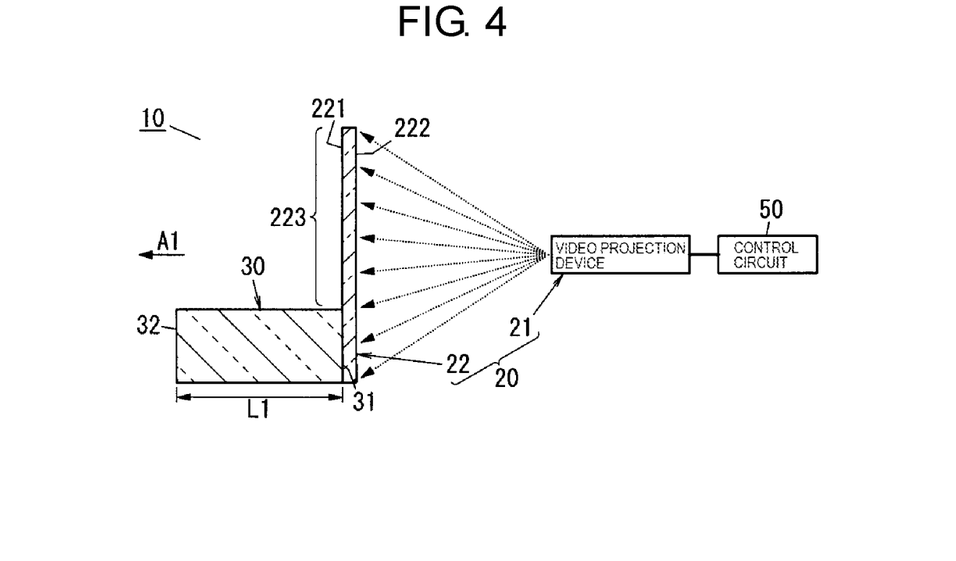
FIG. 4 is a conceptual diagram showing principal portions of the display device.

As shown in FIGS. 3 and 4, display device 10 according to this exemplary embodiment includes: video display 20; optical element 30; projection optical system 40 as a projector; and control circuit 50.

Video display 20 includes video projection device 21 as a projection device and screen 22.

Onto an incident surface of screen 22, video projection device 21 projects an image for forming virtual image 300 in target space 400.

Figure 5A:
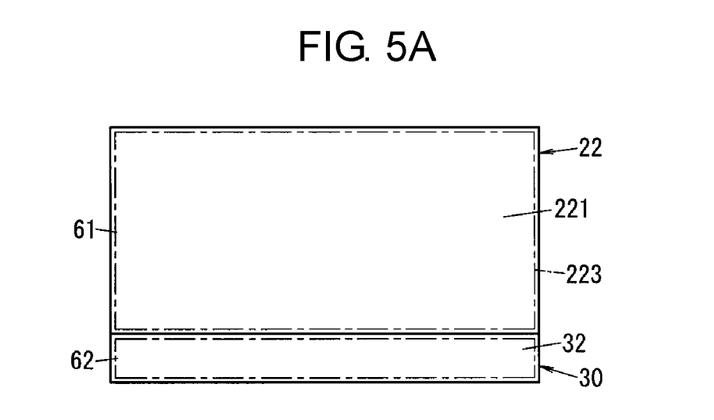
FIG. 5A is a front view showing a screen of the display device.

Screen 22 is composed, for example, of a plate-shaped transparent screen that has light diffusibility and is formed into a rectangular shape (see FIG. 5A). Screen 22 is fixed at a predetermined position with respect to a housing and the like of display device 10. On screen 22, an image is drawn by light projected from video projection device 21, and the image is projected onto windshield 101 by the light that passes through screen 22. Herein, a surface of screen 22 serves as video display surface 221 that displays a video.

For example, optical element 30 is a bundle formed by bundling a plurality of optical fibers with a cladding diameter ranging from several micrometers to several ten micrometers. Optical element 30 is formed into a rectangular shape as viewed from front (see FIG. 5A). Light that enters incident surface 31 on one end side of optical element 30 is guided as it is to emitting surface 32 on the other end side of optical element 30. Incident surface 31 and emitting surface 32 of optical element 30 are parallel to each other. Herein, the fact that incident surface 31 and emitting surface 32 are parallel to each other is not limited to the fact that incident surface 31 and emitting surface 32 are do not intersect each other. Incident surface 31 and emitting surface 32 may intersect each other at an angle of a few degrees if human eyes can determine that incident surface 31 and emitting surface 32 are substantially parallel to each other.

Optical element 30 is disposed on video display surface 221 such that incident surface 31 overlaps a part of video display surface 221 of screen 22 Optical element 30 is fixed to video display surface 221, for example, by a transparent adhesive or the like. Hence, out of the video displayed on video display surface 221, a partial video displayed on a region overlapping incident surface 31 is transmitted as it is to emitting surface 32 of optical element 30. Hence, out of the video displayed on video display surface 221, the partial video displayed on a region overlapping incident surface 31 is moved to a position distant from screen 22 (video display 20) by overall length L1 of optical element 30 in a projection direction (A1 in FIG. 4) of the video.

In this way, a route length of the light to user 200 from emitting surface 32 of optical element 30 is shorter than a route length of the light to user 200 from region 223 that does not overlap optical element 30 in video display surface 221. Hence, the virtual image formed by the video displayed on emitting surface 32 is displayed at a position closer to vehicle 100 than the virtual image formed by the video displayed on region 223 of video display surface 221 is. Accordingly, in display device 10 of this exemplary embodiment, the video for forming first virtual image 301 is displayed on region 223 of video display surface 221, and the video for forming second virtual image 302 is displayed on emitting surface 32. For example, in order to display first virtual image 301 at a position located 10 m to 200 m ahead of vehicle 100, and to display second virtual image 302 at a position located a few meters (for example, 2 m to 3 m) ahead of vehicle 100, the overall length L1 of optical element 30 is set preferably to 1 mm to 20 mm, more preferably to 5 mm to 10 mm.

Projection optical system 40 receives videos from video display surface 221 and emitting surface 32 of optical element 30, and projects virtual image 300 onto target space 400 by the videos thus received (see FIG. 1). As shown in FIG. 3, projection optical system 40 includes first mirror 41 and second mirror 42.

First mirror 41 and second mirror 42 are arranged in this order on the routes of the light emitted from video display surface 221 and emitting surface 32 of optical element 30. First mirror 41 reflects the light, which is emitted from video display surface 221 and emitting surface 32 of optical element 30, toward second mirror 42. Second mirror 42 reflects the light, which is emitted from first mirror 41, toward windshield 101 (see FIGS. 1 and 3). That is, projection optical system 40 projects the videos, which are formed on video display surface 221 and emitting surface 32 of optical element 30, onto windshield 101, thereby projecting virtual image 300 onto target space 400. Note that projection optical system 40 is not limited to one including first mirror 41 and second mirror 42, and may include a lens and another mirror for magnifying or reducing the video in addition to first mirror 41 and second mirror 42. Moreover, projection optical system 40 including the lens, the mirrors and the like may be omitted, and in that case, video projection device 21 also serves as the projector that projects the virtual image onto the target space. That is, the light emitted from video projection device 21 and then emitted from screen 22 and optical element 30 may be projected toward windshield 101 without passing through first mirror 41 and second mirror 42.

Control circuit 50 controls an operation of video projection device 21. For example, control circuit 50 receives a signal from a driving support system mounted on vehicle 100, and determines a content of virtual image 300 to be projected. Control circuit 50 creates a video corresponding to the content of virtual image 300, and controls video projection device 21 to display the created video.

Herein, control circuit 50 is composed of a microcomputer including a central processing unit (CPU) and a memory. In other words, control circuit 50 is realized by such a computer including the CPU and the memory. The CPU executes a program stored in the memory, whereby the computer functions as control circuit 50. Herein, the program is recorded in advance in the memory of control circuit 50; however, may be provided via a telecommunication line such as the Internet or by being recorded in a recording medium such as a memory card.

(3) Operation

Operation of display device 10 according to this exemplary embodiment will now be described herein with reference to FIGS. 1 to 4.

Control circuit 50 controls video projection device 21 to irradiate screen 22 with light from video projection device 21. When screen 22 is irradiated with the light from video projection device 21, the video is formed (projected) on such front surface 221 or back surface 222 of screen 22. Herein, out of both surfaces in a thickness direction of screen 22, a surface facing video projection device 21 is referred to as back surface 21, and a surface opposite with back surface 222 is referred to as front surface 221. In this exemplary embodiment, as an example, since the front surface of screen 22 has light diffusibility, the video is formed on the front surface (video display surface 221) of screen 22. Then, out of the videos formed on video display surface 221, the partial video formed on the region that overlaps optical element 30 enters incident surface 31 of optical element 30, and is transmitted to emitting surface 32 of optical element 30 by optical element 30. Hence, the videos are individually displayed on region 223 in which optical element 30 does not overlap on video display surface 221 and on emitting surface 32 of optical element 30. Then, the videos individually displayed on region 223 of video display surface 221 and on emitting surface 32 of optical element 30 are reflected by first mirror 41 and second mirror 42, and are projected onto windshield 101. In this way, the videos individually displayed on region 223 of video display surface 221 and on emitting surface 32 of optical element 30 are projected onto windshield 101 from below windshield 101 in the cabin of vehicle 100.

When the video is projected from projection optical system 40 onto windshield 101, windshield 101 reflects the light, which is projected from projection optical system 40, toward user 200 (driver) in the cabin. This allows user 200 to view the video reflected by windshield 101. As a result, user 200 views virtual image 300 (first virtual image 301 or second virtual image 302), which is projected in front of vehicle 100 (outside of the vehicle), through windshield 101. That is, user 200 can see virtual image 300 (first virtual image 301 or second virtual image 302) while superimposing virtual image 300 concerned on a scene outside the vehicle, which is seen through windshield 101.

In display device 10 of this exemplary embodiment, a part of the video displayed on video display surface 221 (that is, the partial image) is moved by optical element 30 in a direction away from video projection device 21 by an amount of overall length L1 of optical element 30 with respect to video display surface 221. Hence, in display device 10 of this exemplary embodiment, the route length of the light between emitting surface 32 of optical element 30 and user 200 can be shortened by overall length L1 of optical element 30 more than the route length of the light between region 223 of video display surface 221 and user 200. Hence, second virtual image 302 projected by the video displayed on emitting surface 32 of optical element 30 is displayed closer to user 200 than first virtual image 301 projected by the video displayed on region 223 of video display surface 221 is. Moreover, in display device 10, a distance between video projection device 21 and a part corresponding to region 223 on back surface 222 of screen 22 and a distance between video projection device 21 and a part corresponding to incident surface 31 of optical element 30 on back surface 222 of screen 22 become substantially equal to each other. Hence, the depth of focus of video projection device 21 can be reduced in comparison with the case in which two screens on which the light projected from video projection device 21 forms images are placed at distant places. In this way, the resolutions of the videos displayed on region 223 of video display surface 221 and on emitting surface 32 of optical element 30 can be improved, whereby the resolutions of first virtual image 301 and second virtual image 302 can be improved.

Moreover, when two screens are used to display such virtual images having viewing distances different from each other, a gap may be formed between the two screens, and direct light from video projection device 21 may pass through the gap between the two screens, and enter user 200. In particular, if the two screens are present at distant places in projection direction A1 of the light from video projection device 21, the gap formed between the two screens is increased when the two screens are seen from a direction obliquely intersecting projection direction A1. Herein, the "viewing distance" refers to a distance to the virtual image recognized by user 200 when user 200 sees the virtual image. Moreover, the light that passes through the two screens may have hit corners of the screens to generate scattered light. In contrast, in this exemplary embodiment, on video display surface 221, no gap is formed between the region in which optical element 30 is disposed and the region in which optical element 30 is not disposed. Hence, this exemplary embodiment has an advantage that the direct light from video projection device 21 is less likely to enter the user, and that the scattered light generated in such a manner that the light hits edge portions of screen 22 can be reduced.

(4) Modified Examples

Figure 5B:
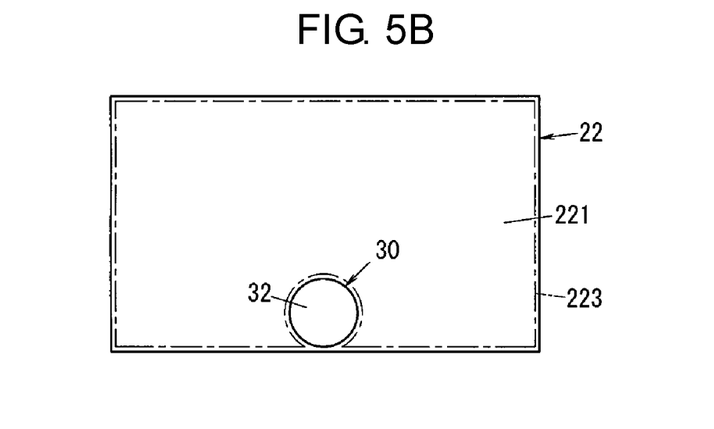
FIG. 5B is a front view showing a screen of a display device according to a first modified example of the exemplary embodiment of the present disclosure.

In the above-described exemplary embodiment, the shape of optical element 30 as viewed from the front is not limited to rectangular, and as shown in FIG. 5B, the shape of optical element 30 as viewed from the front may be circular, and this circular optical element 30 is suitable for displaying a circular meter and the like (first modified example). Moreover, as long as optical element 30 is capable of displaying the video for projecting virtual image 300, the shape of optical element 30 may be a polygonal shape, an ellipsoidal shape and the like, which are other than such a rectangular shape. In a similar way, as long as screen 22 is capable of displaying the video for projecting virtual image 300, the shape of screen 22 may be a polygonal shape, an ellipsoidal shape, a circular shape, and the like, which are other than such a rectangular shape.

In the above-described exemplary embodiment, optical element 30 is not limited to the bundle formed by bundling the optical fibers, and may be a group of fibrous crystals (so-called television stones) in which elongated crystals of minerals are parallel-intergrown.

Figure 6:
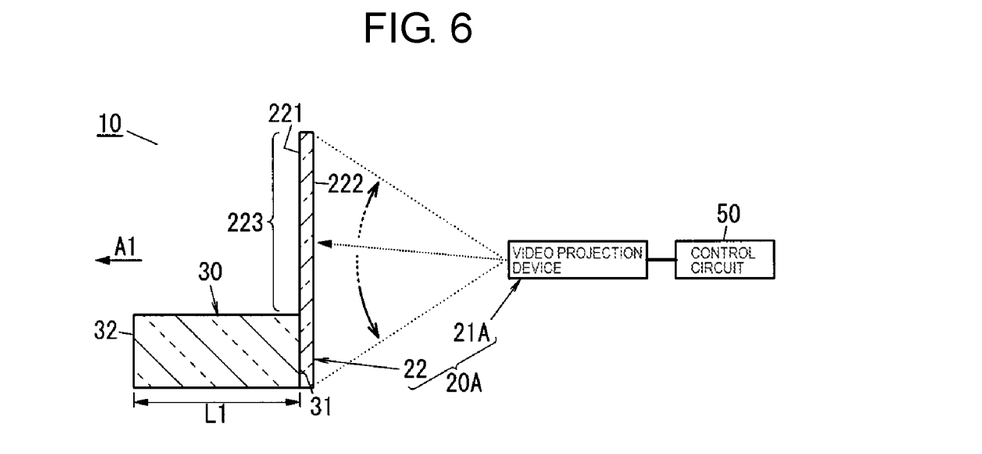
FIG. 6 is a conceptual diagram showing principal portions of a display device according to a second modified example of the exemplary embodiment of the present disclosure.

In the above-described exemplary embodiment, video display 20 is the video projection device that simultaneously projects the whole of the video and forms an image on video display surface 221. However, the video projection device may be video display 20A including video projection device 21A (projection device) of a laser scanning type as shown in FIG. 6 (second modified example). Note that the same reference numerals are assigned to constituents common to those in the above-described exemplary embodiment, and a description of the constituents will be omitted.

Video projection device 21A includes: a laser light source that outputs laser light; and a scanning optical system such as a microelectromechanical system (MEMS) mirror that scans the laser light output from the laser light source. Video projection device 21A scans the laser light, which is output from the laser light source, by the scanning optical system, whereby videos are drawn on region 223 of video display surface 221 of screen 22 and on emitting surface 32 of optical element 30.

Figure 7:
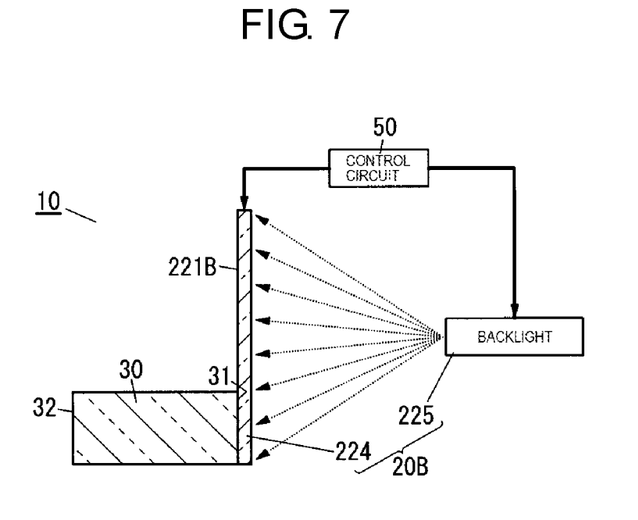
FIG. 7 is a conceptual diagram showing principal portions of a display device according to a third modified example of the exemplary embodiment of the present disclosure.

Moreover, video display 20 is not limited to those having video projection device 21, 21A which project the light onto screen 22. Video display 20 may be image display 20B as shown in FIG. 7, which is composed of flat panel display 224 such as a liquid crystal panel and a backlight 225 (third modified example). Note that the same reference numerals are assigned to constituents common to those in the above-described exemplary embodiment, and a description of the constituents will be omitted.

For example, backlight 225 is a planar light source formed by combining light-emitting diodes and a light guide plate with each other. The light guide plate is disposed along a back surface of flat panel display 224. When light of the light-emitting diodes enters the light guide plate from an edge portion of the light guide plate, a whole of a front surface of the light guide plate emits light, whereby a video is output from a front surface of flat panel display 224. Note that backlight 225 may be a planar light source formed by combining the light-emitting diodes and a diffusion plate with each other. The diffusion plate is disposed along the back surface of flat panel display 224. The diffusion plate diffuses the light that enters the diffusion plate from the light-emitting diodes. In this way, a whole of the diffusion plate emits light, and a video is output from the front surface of flat panel display 224.

In the third modified example, the front surface of flat panel display 224 serves as video display surface 221B, and optical element 30 is disposed on a part of video display surface 221B (front surface of flat panel display 224). Note that flat panel display 224 is not limited to the liquid crystal panel, and may be a self-luminous flat panel display such as an organic electro luminescence (EL) display. In this case, backlight 225 can be omitted. Note that this configuration of the third modified example may be applied to the first modified example described above.

Figure 8:
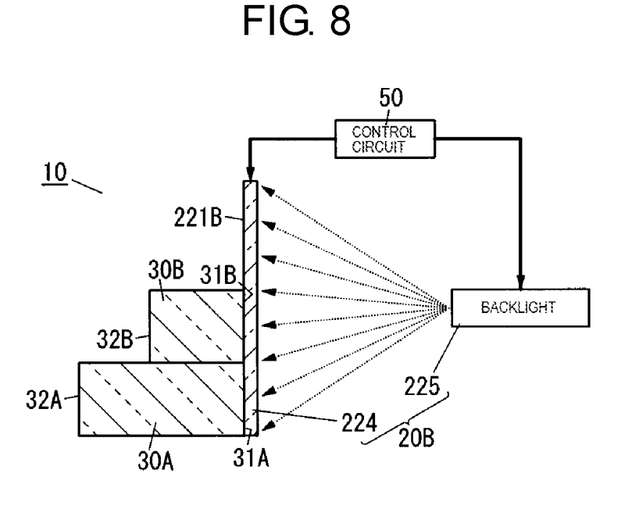
FIG. 8 is a conceptual diagram showing principal portions of a display device according to a fourth modified example of the exemplary embodiment of the present disclosure.

Moreover, in display device 10 of the third modified example, which is shown in FIG. 7, single optical element 30 is disposed on video display surface 221B on which the video is displayed; however, as shown in FIG. 8, two optical elements 30A, 30B may be disposed on video display surface 221B (fourth modified example). Note that the same reference numerals are assigned to constituents common to those in the third modified example, and a description of the constituents will be omitted.

In the fourth modified example, three types of virtual images having viewing distances different from one another can be projected by a video of a region in which optical elements 30A, 30B are not disposed on video display surface 221B, and by videos of emitting surfaces 32A, 32B of optical elements 30A, 30B respectively. Note that three or more optical elements may be disposed on video display surface 221B. Moreover, also in each of the exemplary embodiment and the first to third modified examples, which are described above, the plurality of optical elements 30 may be disposed on the video display surface.

Figure 9:
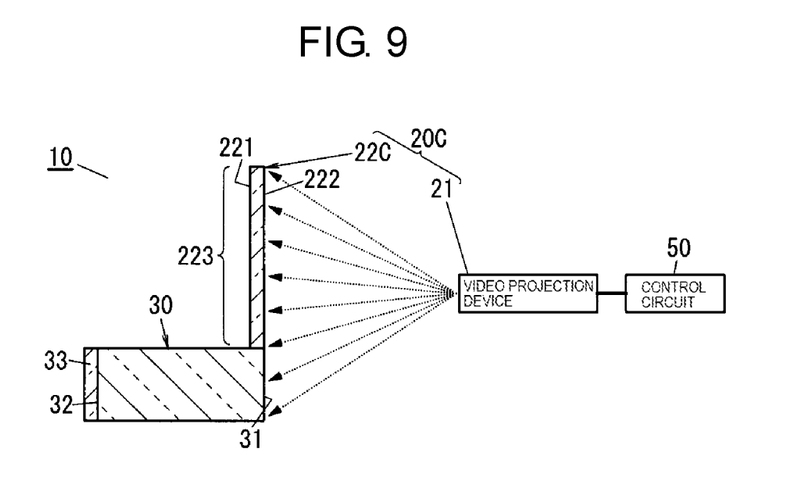
FIG. 9 is a conceptual diagram showing principal portions of a display device according to a fifth modified example of the exemplary embodiment of the present disclosure.

Although optical element 30 is disposed on a part of the front surface of screen 22 in the above-described exemplary embodiment, screen 22 and optical element 30 may be disposed side by side as shown in FIG. 9 (fifth modified example). Note that the same reference numerals are assigned to constituents common to those in the above-described exemplary embodiment, and a description of the constituents will be omitted.

Screen 22 and optical element 30 are fixed at predetermined positions with respect to the housing and the like of display device 10. Herein, back surface 222 of screen 22 and incident surface 31 of optical element 30 are present at substantially the same position in such a direction in which the light is projected from video projection device 21. Moreover, light diffuser 33 having light diffusibility is fixed to emitting surface 32 of optical element 30 by adhesive or the like. Light diffuser 33 is formed of a resin material in which a light diffusing agent having different refractive index from that of transparent resin is dispersed in the transparent resin. Note that light diffuser 33 may be one in which microprisms are formed on a surface of a flat plate made of transparent resin or transparent glass.

The light projected from video projection device 21 enters back surface 222 of screen 22 and incident surface 31 of optical element 30. In this way, videos are displayed on video display surface 221 as the front surface of screen 22 and a front surface of light diffuser 33 fixed to emitting surface 32 of optical element 30. That is, in the fifth modified example, the front surface of screen 22 and the front surface of light diffuser 33 fixed to emitting surface 32 of optical element 30 serve as video display surfaces which display the videos, and virtual images are projected onto the target space by the videos displayed on these video display surfaces.

As described above, light diffuser 33 is provided on emitting surface 32 of optical element 30. Accordingly, even if external light such as sunlight hits light diffuser 33 for example, the external light is diffusely reflected by light diffuser 33. Therefore, light rays as a result of specular reflection of the sunlight are weakened, and glaring light is less likely to hit user 200. Herein, also in each of the exemplary embodiment and the first to fourth modified examples, which are described above, the plurality of optical elements 30 may be disposed on the video display surface.

Figure 10:
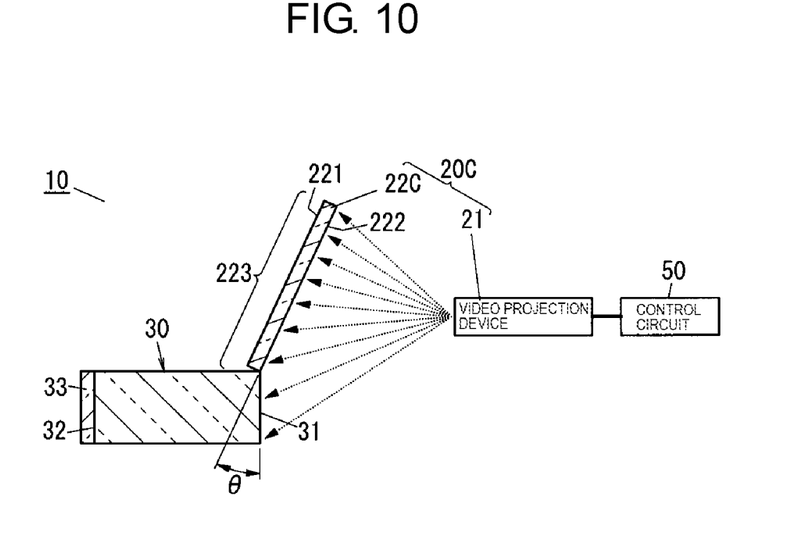
FIG. 10 is a conceptual diagram showing principal portions of a display device according to a sixth modified example of the exemplary embodiment of the present disclosure.

Herein, in the fifth modified example shown in FIG. 9, incident surface 31 of optical element 30 and back surface 222 of screen 22 are parallel to each other; however, as shown in FIG. 10, back surface 222 of screen 22 may intersect incident surface 31 of optical element 30 at predetermined angle θ (sixth modified example). In this case, first virtual image 301 can be projected along road surface 600 on first virtual plane 501 by the video displayed on video display surface 221 of screen 22.

Note that this configuration of the sixth modified example may be applied to the exemplary embodiment and the first to fourth modified examples, which are described above. That is, on video display surface 221 of screen 22, a rear surface of the region in which optical element 30 is disposed and a rear surface of region 223 in which optical element 30 is not disposed may intersect each other at a predetermined angle. Also in this case, first virtual image 301 can be projected along road surface 600 on first virtual plane 501 by the video displayed on region 223.

Figure 11:
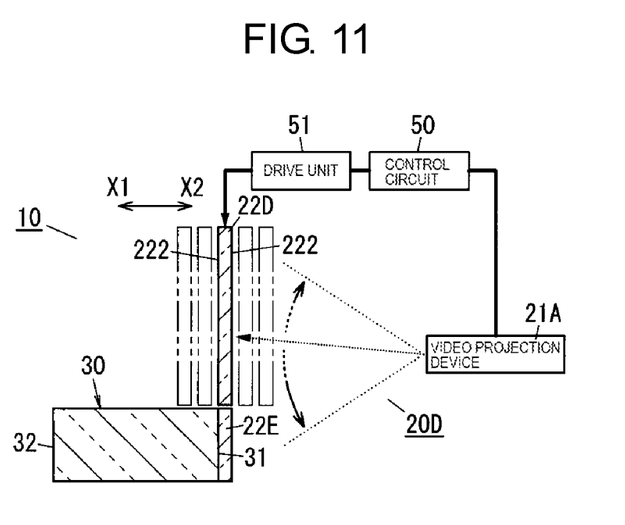
FIG. 11 is a conceptual diagram showing principal portions of a display device according to a seventh modified example of the exemplary embodiment of the present disclosure.

Moreover, in the above-described exemplary embodiment, optical element 30 is disposed on single screen 22; however, as shown in FIG. 11, in the screen, a portion in which optical element 30 is disposed and a portion in which optical element 30 is not disposed may be separated from each other (seventh modified example).

Video display 20D of the seventh modified example includes: two screens 22D, 22E; video projection device 21A that projects videos on screens 22D, 22E; and drive unit 51.

Screen 22E is fixed at a predetermined position with respect to a housing and the like of display device 10. Optical element 30 is fixed to a front surface of screen 22E by an adhesive and the like.

Screen 22D is configured to be movable in movement direction X (direction indicated by arrows X1-X2 in FIG. 11) with respect to the housing and the like of display device 10. That is, when display device 10 is disposed in dashboard 102, screen 22E which is a fixed screen is fixed at a predetermined position in dashboard 102, and screen 22D which is a movable screen is movable in movement direction X in dashboard 102.

Drive unit 51 moves screen 22D in movement direction X. For example, drive unit 51 is composed of an electric drive actuator such as a voice coil motor, and moves screen 22D in response to a control signal output from control circuit 50.

While controlling drive unit 51 to move screen 22D along movement direction X, control circuit 50 controls video projection device 21 to project light onto screen 22D, thereby drawing first virtual image 301. That is, video projection device 21 is caused to scan screen 22D with laser light while moving screen 22D, which is disposed perpendicularly to movement direction X, in movement direction X. In this way, the same state as that of drawing the video on the screen disposed obliquely to the movement direction X is established. Moreover, if video projection device 21 is caused to scan screen 22D with laser light in a state in which screen 22D is stopped at an arbitrary position, then the video can be drawn on the screen disposed perpendicularly to movement direction X.

Herein, a video display surface is composed of: a display surface (front surface or back surface) of screen 22E which is a fixed screen; and a display surface (front surface or back surface) of screen 22D which is a movable screen.

In the seventh modified example, screen 22D moves in movement direction X, whereby the position of the back surface of screen 22E and the position of back surface 222 of screen 22D are shifted from each other in movement direction X. Even in this case, such a positional shift between the back surface of screen 22E and back surface 222 of screen 22D can be reduced within a range of moving screen 22D in comparison with the case in which optical element 30 is not present. Thus, the depth of focus of video projection device 21A can be reduced. In this way, the resolutions of the videos displayed on video display surface 221 of screen 22D and on emitting surface 32 of optical element 30 can be improved, whereby the resolutions of first virtual image 301 and second virtual image 302 can be improved. In the seventh modified example, screen 22E on which optical element 30 is disposed is a fixed screen, and screen 22D on which optical element 30 is not disposed is moved. Therefore, a load of drive unit 51 can be reduced; however, the above-described configuration of screens 22E, 22D may be reversed. That is, screen 22D on which optical element 30 is not disposed may be used as a fixed screen, and screen 22E on which optical element 30 is disposed may be moved in movement direction X. Moreover, in each of the exemplary embodiment and the first to fourth modified examples, the whole of screen 22 on which optical element 30 is disposed may be moved in movement direction X. Furthermore, while screen 22E is fixed to incident surface 31 of optical element 30, the light diffuser may be fixed to emitting surface 32 of optical element 30.

Furthermore, in the above-described exemplary embodiment, the "video display surface" just needs to be a surface for forming an image on each of screens 22 to 22E, is not limited to surface 221 of each of screens 22 to 22E, and for example, may be back surface 222 of each of screens 22 to 22E. Moreover, an entire region of front surface 221 (or back surface 222) of each of screens 22 to 22E does not need to be the "video display surface", and the "video display surface" may be a partial region of front surface 221 (or back surface 222) of each of screens 22 to 22E. In this case, the image is formed only on a partial region of front surface 221 (or back surface 222) of each of screens 22 to 22E.

Moreover, each of screens 22 to 22E is not limited to such a configuration in which the light diffusibility is provided to only front surface 221, and for example, the light diffusibility may be provided to only back surface 222 or to both of front surface 221 and back surface 222. When the light diffusibility is provided to back surface 222 of each of screens 22 to 22E, the image is formed on back surface 222 of each of screens 22 to 22E.

Furthermore, display device 10 is not limited to the configuration of projecting virtual image 300 onto target space 400 set in front of vehicle 100 in the traveling direction. For example, display device 10 may project virtual image 300 on a side portion, rear portion, upper portion and the like in the traveling direction of vehicle 100.

In addition, display device 10 is not limited to the head-up display for use in vehicle 100. For example, display device 10 is also applicable as a display for a mobile body other than vehicle 100, the other mobile body including a motorcycle, a train, an aircraft, a construction machine, a vessel and the like for example. Moreover, the place of use of display device 10 is not limited to the mobile body. For example, display device 10 may be used in an amusement facility. Display device 10 may also be used as a wearable terminal such as a head mounted display (HMD). Furthermore, display device 10 may be used at a medical facility, and may be used as a stationary device.

Conclusion

As described above, display device (10) of the first aspect includes video display (20, 20A, 20B, 20C, 20D), optical element (30, 30A, 30B), and projector (40). Video display (20, 20A, 20B, 20C, 20D) displays a video on video display surface (221, 221B). Optical element (30, 30A, 30B) moves a partial video, which is a part of the video displayed on video display surface (221, 221B), to a position distant from video display (20, 20A, 20B, 20C, 20D) in projection direction (A1) of the video. Projector (40) projects virtual image (300, 301, 302) viewed by a user by projecting light output from video display (20, 20A, 20B, 20C, 20D) and optical element (30, 30A, 30B) to a reflecting member. Optical element (30, 30A, 30B) has an incident surface (31) on which the partial video is incident, and an emitting surface (32, 32A, 32B) from which the partial video incident on the incident surface (31) emits. Incident surface (31) and emitting surface (32, 32A, 32B) are parallel to each other.

In accordance with this configuration, the viewing distances of virtual image (301) and virtual image (302) can be differentiated from each other. Herein, virtual image (301) is formed by the video on the region on which optical element (30, 30A, 30B) is not disposed on video display surface (221, 221B), and virtual image (302) is formed by the video on the emitting surface of optical element (30, 30A, 30B). In addition, it is not necessary to vary the position of video display surface (221, 221B), which is caused to display the video by video display (20, 20A, 20B, 20C, 20D), in projection direction (A1), in order to differentiate the viewing distances from each other. Hence, the depth of focus of video display (20, 20A, 20B, 20C, 20D) is reduced, and the resolution of the video, that is, the resolution of the virtual image can be improved.

In display device (10) of the second aspect, in the first aspect, optical element (30, 30A, 30B) is disposed on a part of video display surface (221, 221B).

In accordance with this configuration, the video on the region on which optical element (30, 30A, 30B) is disposed on video display surface (221, 221B) can be moved in projection direction (A1), so that a plurality of the virtual images having viewing distances different from each other can be projected.

In display device (10) of the third aspect, in any one of the first and second aspects, the plurality of optical elements (30A, 30B) are disposed on video display surface (221, 221B).

In accordance with this configuration, the plurality of virtual images having viewing distances different from each other can be projected by the videos displayed on emitting surfaces (32A, 32B) of the plurality of optical elements (30A, 30B).

In display device (10) of the fourth aspect, in any one of the first to third aspects, video display (20, 20A, 20B, 20C, 20D) is a projection device that forms an image on video display surface (221, 221B) by projecting light onto video display surface (221, 221B).

In accordance with this configuration, the depth of focus of video display (20, 20A, 20C, 20D) can be reduced, whereby a video with high resolution can be displayed on video display surface (221, 221B).

In display device (10) of the fifth aspect, in any one of the first to third aspects, the video display is video display device (20B) that has a flat display panel displaying the video, and a backlight.

In accordance with this configuration, it is not necessary to vary the position of the video display surface, which is caused to display the video by the video display, in the projection direction, in order to differentiate the viewing distances from each other. Therefore, the video display can be realized by single video display device (20B).

In display device (10) of the sixth aspect, in any one of the first to fifth aspects, optical element (30, 30A, 30B) is disposed in front of video display surface (221, 221B) in projection direction (A1).

In accordance with this configuration, optical element (30, 30A, 30B) can move a part of the video, which is displayed on video display surface (221, 221B), in front in projection direction (A1). In addition, there is also an advantage that video display surface (221, 221B) can be composed of a single screen or a single video display device.

In display device (10) of the seventh aspect, in any one of the first to sixth aspects, light diffuser (33) that diffuses light is provided on emitting surface (32, 32A, 32B) of optical element (30, 30A, 30B).

In accordance with this configuration, light diffuser (33) is provided on emitting surface (32, 32A, 32B). Therefore, even if the light such as sunlight hits light diffuser (33) for example, the external light can be diffusely reflected by light diffuser (33).

In display device (10) of an eighth aspect, in any one of the first to seventh aspects, the video display surface includes the display surface of fixed screen (22E) fixed to a predetermined position, and the display surface of movable screen (22D). Optical element (30) is provided on the display surface of fixed screen (22E).

In accordance with this configuration, the virtual image projected by the video of movable screen (22D) can be inclined with respect to the virtual image projected by the video of fixed screen (22E). Moreover, the viewing distance of the virtual image projected by the video of fixed screen (22E) can be shortened in comparison with the virtual image projected by the video of movable screen (22D).

The configurations according to the second to eighth aspects are not essential configurations for display device (10), and it is possible to appropriately omit these configurations.

Mobile body (100) of a ninth aspect includes: body (109); display device (10) according to any one of the first to eighth aspects, display device (10) being mounted on body (109); reflecting member (101) fixed to body (109); and mobile body drive unit (104) that moves body (109).

In accordance with this configuration, mobile body (100) including display device (10) capable of improving the resolution of the virtual image can be provided.

The present disclosure is useful for a display device, and for a mobile body including the display device.

What is claimed is:

1. A display device comprising:
a video display that displays a video on a video display surface, the video including a first video and a second video;
at least one optical element that is disposed on a part of the video display surface and has an incident surface on which the second video is incident, and an emitting surface from which the second video incident on the incident surface emits, and the incident surface and the emitting surface are parallel to each other; and
a projector that projects a virtual image viewed by a user by projecting the first video displayed on the video display and the second video emitted from the emitting surface of the at least one optical element to a reflecting member the virtual image including a first virtual image and a second virtual image, the first virtual image corresponding to the first video, and the second virtual image corresponding to the second video.

2. The display device according to claim 1, wherein
the at least one optical element includes a plurality of optical elements, and
the plurality of optical elements are disposed on the video display surface.

3. The display device according to claim 1, wherein
the video display is a projection device that forms the video on the video display surface by projecting light onto the video display surface.

4. The display device according to claim 1, wherein
the video display is a video display device that has a flat display panel displaying the video, and a backlight.

5. The display device according to claim 1, wherein
a light diffuser that diffuses light is provided on the emitting surface of the at least one optical element.

6. The display device according to claim 1, wherein
the video display surface includes a display surface of a fixed screen fixed to a predetermined position, and a display surface of a movable screen, and
the at least one optical element is provided on the display surface of the fixed screen.

7. A mobile body comprising:
a body;
the display device according to claim 1, the display device being mounted on the body;
the reflecting member fixed to the body; and
a mobile body drive unit that moves the body.

8. The display device according to claim 1, wherein
the position at which the second virtual image is projected changes based on a length of the at least one optical element, the length being a length in a direction perpendicular to the video display surface.

9. The display device according to claim 1, wherein
the at least one optical element is a bundle of a plurality of optical fibers.

10. The display device according to claim 1, wherein
the at least one optical element is a group of fibrous crystals.

11. The display device according to claim 1, wherein
a position at which the second virtual image is projected is nearer to the user than a position at which the first virtual image is projected.

* * * * *